United States Patent [19]

Sugishima et al.

[11] Patent Number: 4,745,535

[45] Date of Patent: May 17, 1988

[54] RINGING CHOKE TYPE DC/DC CONVERTER

[75] Inventors: Eiichi Sugishima; Osamu Miyazaki, both of Nagoya, Japan

[73] Assignee: Mitsubishi Denki Kabushiki Kaisha, Japan

[21] Appl. No.: 25,093

[22] Filed: Mar. 12, 1987

[30] Foreign Application Priority Data

| Mar. 14, 1986 | [JP] | Japan | 61-37719[U] |
|---|---|---|---|
| Mar. 14, 1986 | [JP] | Japan | 61-37720[U] |
| Mar. 14, 1986 | [JP] | Japan | 61-37721[U] |
| Mar. 14, 1986 | [JP] | Japan | 61-37722[U] |

[51] Int. Cl.[4] .......................................... H02M 3/335
[52] U.S. Cl. ........................................ 363/19; 363/97; 331/112
[58] Field of Search ............... 363/18, 19, 131, 97; 331/112; 323/289

[56] References Cited

U.S. PATENT DOCUMENTS

| 3,753,075 | 8/1973 | Tomura et al. | 363/131 |
| 4,307,353 | 12/1981 | Nilssen | 323/289 X |
| 4,316,242 | 2/1982 | Colangelo et al. | 363/21 |

FOREIGN PATENT DOCUMENTS

| 0059324 | 5/1981 | Japan | 363/19 |
| WO82/01627 | 5/1982 | PCT. Int'l Appl. | |
| 948025 | 1/1964 | United Kingdom | |
| 1021811 | 3/1966 | United Kingdom | |
| 1456383 | 11/1976 | United Kingdom | |
| 1591215 | 6/1981 | United Kingdom | |
| 2090705 | 7/1982 | United Kingdom | |
| 0760334 | 9/1980 | U.S.S.R. | 363/19 |

OTHER PUBLICATIONS

"Design for Switching Regulator", Morita, *Transistor Technique*, Sep. 1977, pp. 211–219.

*Primary Examiner*—Peter S. Wong
*Attorney, Agent, or Firm*—Leydig, Voit & Mayer

[57] ABSTRACT

A ringing choke-type DC/DC converter comprising a transformer having a primary winding, a secondary winding, and a feedback winding, an input DC power source connected through a transistor to the primary winding of the transformer, a DC power output connected through a diode to the secondary winding of the transformer, a base circuit having a first capacitor and connected between the base of the transistor and the feedback winding of the transformer, a branch circuit branching from the base circuit and having a Zener diode connected in series with a second capacitor, and an impedance provided in series between the transistor and the branch circuit for preventing the transistor from intermittently operating, thereby stabilizing the DC power output.

5 Claims, 6 Drawing Sheets

RINGING CHOKE TYPE DC/DC CONVERTER

BACKGROUND OF THE INVENTION

This invention relates to improvements in a ringing choke type DC/DC converter for controlling in response to variations in a load, an input voltage and an environmental temperature.

FIG. 1 is a circuit illustrating a prior-art ringing choke type DC/DC converter (hereinbelow referred to as an "R.C.C") disclosed, for example, in FIG. 6 on page 214 of TRANSISTOR TECHNIQUE, issued in September, 1977 (by CQ Publication Co., Japan). In the drawing, numeral 1 denotes a d.c. power source and numeral 2 a transformer having a primary winding 3, a feedback winding 6, and a secondary winding 2. The starting end of the primary winding 3 is connected to the positive electrode of the d.c. power source 1, and the finishing end of the primary winding 3 is connected to the collector of a transistor 4. The emitter of the transistor 4 is connected to the negative electrode of the d.c. power source 1. Numeral 5 denotes a starting resistor connected between the positive electrode of the d.c. power source 1 and the base of the transistor 4. The starting end of the feedback winding 6 is connected through a series circuit including a resistor 7 and a capacitor 8 to the base of the transistor 4, and the finishing end of the feedback winding 6 is connected to the emitter of the transistor 4. Numeral 9 denotes a diode having the cathode side connected to the starting end of the feedback winding 6, and the anode side connected to the negative electrode of a capacitor 10. The positive electrode of the capacitor 10 is connected to the finishing end of the feedback winding 6. Numeral 11 denotes a Zener diode having the cathode side connected to the base of the transistor 4, and the anode side connected to the negative electrode of the capacitor 10. Numeral 13 denotes a diode having the anode side connected to the finishing end of the secondary winding 12, and the cathode side connected to the positive electrode of a capacitor 14. The negative electrode of the capacitor 14 is connected to the starting end of the secondary winding 12. Numeral 15 denotes a load connected to both ends of the capacitor 14.

The self-excited oscillating operation of the R.C.C will be described with reference to FIG. 2 which illustrates the waveforms of respective points as a function of operating time. When a power switch, not shown, is turned on, a voltage Vin from the d.c. power source 1 is applied across the starting resistor 5 and the transistor 4 to provide a base current $i_B$ flowing through the base of the transistor 4. Thus, the transistor 4 is turned on to allow a current, hereinafter referred to as the collector current $i_C$, to flow through the primary winding 3. A voltage generated in the feedback winding 6 by the magnetomotive force of the primary winding 3 due to the collector current $i_C$ is differentiated by the resistor 7 and the capacitor 8 to provide base current with a differentiated waveform so as to quickly saturate the transistor 4. On the other hand, since this same voltage is reversely applied to the diode 9 which is used for rectifying a load output of the transistor 4 in this saturated state, no current flows therethrough. Hence, the collector current $i_C$ becomes $i_C = h_{fe} \cdot i_B$, where $h_{fe}$ denotes the current amplification factor of the transistor 4. At this time, the magnetic flux in the core of the transformer 2 becomes constant, and no voltage is generated in the respective windings. As a result, the transistor 4 is rapidly shifted to an off state. When the transistor 4 becomes the off state, a vibrating voltage of reverse polarity to the on state of the transistor 4 is generated in the windings by the magnetic energy stored in the transformer 2 during the flow of collector current $i_C$. Therefore, a voltage of the direction for turning ON the diode 13 is output to the secondary winding 12 at this time to charge the capacitor 14 and to supply a power to the load 15. Here, a voltage of reverse direction between the base and the emitter of the transistor 4 is similarly generated in the feedback winding 6 to charge the capacitor 8 through the resistor 7 so that the electrode side connected to the base of the transistor 4 becomes positive. Here, since a variation in the magnetic flux in the core of the transformer 2 becomes constant when the magnetic energy stored during the on period is discharged to all the loads of the windings, the voltages of the windings of the transformer 2 tend to be cancelled. Here, the base current $i_B$ flows as a forward base current from the capacitor 8 to the transistor 4 in response to the variation in the voltage, and the transistor 4 again becomes ON state. Thus, the transistor 4 alternatively repeats the ON state and the OFF state to repeat the switching of the transistor 4, thereby continuing a self-excited oscillation.

Then, a mechanism for controlling the voltage in FIG. 1 will be described. As described above, the feedback winding 6 generates a voltage in the direction for turning ON the diode 9 during the OFF period of the transistor 4 to charge the capacitor 10. Thus, it is considered that the voltage across the capacitor 10 is substantially proportional to an output voltage Vo and an input voltage Vin. Therefore, the sum of the charging voltage of the capacitor 10 and the induced voltage of the feedback winding 6 is applied to the Zener diode 11 when the transistor 4 is next turned on, and a Zener current proportional to the difference between both the voltages flows therethrough. Thus, a part of the current supplied from the feedback winding 6 to the base of the transistor 4 is bypassed as the Zener current to control the base current $i_B$ of the transistor 4, thereby controlling the ON duration of the transistor 4 to act so that the output voltage Vo becomes stable irrespective of the input voltage Vin and the load 15. The operating principle of controlling the voltage described above will be further described in more detail with an equivalent circuit shown in FIG. 3.

Since FIG. 3 is shown for the convenience of describing the voltage control, the capacitor 8 which does not relate directly to the voltage control is omitted. The base emitter junction of the transistor is represented by a linear type in the equivalent circuit in FIG. 3 if the base current $i_B$ flows forwardly in the transistor 4, and the voltage $V_{BE}$ between the base and the emitter is to be represented by the following equation (1).

$$V_{BE} = r_B i_B + V_B \tag{1}$$

where $r_B$ denotes the operating resistance of the transistor 4, and $V_B$ denotes a junction barrier voltage. Similarly, if the voltage applied between the anode and the cathode of the Zener diode 11 becomes as high as the Zener voltage, the Zener current $i_Z$ flows, and the Zener diode voltage $V_{ZD}$ is to be represented by the following equation (2) in a linear type.

$$V_{ZD} = r_Z i_Z + V_Z \tag{2}$$

where $r_Z$ denotes the operating resistance of the Zener diode 11, and $V_Z$ denotes a Zener voltage. Since the equivalent circuit of FIG. 3 is shown at a timing that the transistor 4 is turned ON, a feedback voltage of $V_f$ is generated in the feedback winding 6 in the direction as shown in FIG. 3. Further, the capacitor 10 is charged to a voltage produced by subtracting the voltage $V_f$ of the feedback winding 6 by the ON voltage of the diode 9 during the OFF period of the transistor 4 and hence a voltage $V_{Cf}$. If the ON voltage of the diode 9 is extremely low so as to be ignored, it is said that the charging voltage $V_{Cf}$ is substantially equal to the voltage $V_f$ of the feedback winding 6 during the OFF period of the transistor 4. The capacitor 10 has a capacitive component $C_f$ and an impedance component $r_{Cf}$. A current flowing to the resistor 7 is represented by $i_f$. Here, assume that the feedback current $i_f$ is branched to the base current $i_B$ and the Zener current $i_Z$ to be the state of the following equation (3), $$i_B = i_f - i_Z \quad (3)$$

the following equation (4) is satisfied.

$$r_B i_B + V_B = r_Z i_Z + V_Z + \frac{1}{C_f}\int i_Z dt - V_{Cf} + r_{Cf} i_Z \quad (4)$$

In the equation (4), $$\frac{1}{C_f}\int i_Z dt$$

denotes the ripple voltage of the capacitor 10. If $r_B i_B$ is smaller than the other terms to be ignored and $C_f$ is sufficiently large to make the term $$\frac{1}{C_f}\int i_Z dt$$

negligible, the equation (4) can be expressed by the following equation (5).

$$V_B = (r_Z + r_{Cf})i_Z + V_Z - V_{Cf} \quad (5)$$

Therefore, the $i_Z$ is represented by the following equation (6) from the equation (5).

$$i_Z = \frac{V_{Cf} + V_B - V_Z}{(r_Z + r_{Cf})} \quad (6)$$

If the equation (5) is transformed in term of the $V_Z$, the following equation (7) is attained.

$$V_Z = V_B + V_{Cf} - (r_Z + r_{Cf})i_Z \quad (7)$$

Here, when the Zener diode 11 is not turned on, $i_Z = 0$. Therefore, the equation (7) can be represented by the following equation (8).

$$V_{ZD} = V_B + V_{Cf} \quad (8)$$

If the input voltage Vin is raised or the load 15 is lightened so that the charging voltage $V_{Cf}$ increases and the $V_{ZD}$ in the equation (8) become equal to or greater than $V_Z$ as below, $$V_{ZD} \geq V_Z \quad (9)$$

the Zener current $i_Z$ represented by the equation (6) flows. Here, if the input voltage Vin is raised or the load 15 is lightened, the feedback voltage $V_f$ rises and the feedback current $i_f$ also increases, but since the charging voltage $V_{Cf}$ also increases so that the Zener current $i_Z$ increases, the base current $i_B$ flowing to the transistor 4 is limited by the equation (3) to shorten the ON width, thereby controlling so that the charging voltage $V_{Cf}$ becomes a target value $V_Z$.

The above description is the detailed mechanism of the voltage control.

Since the prior-art R.C.C is constructed as described above, if the input voltage Vin is raised, the load 15 is lightened or the environmental temperature is lowered, there is a problem that the oscillation of the transistor 4 becomes intermittent to cause the output voltage Vo to become unstable. Thus, in order to stably operate the R.C.C., it is necessary to limit the input voltage Vin, to apply a dummy load to the load 15, to limit the environmental temperature or to increase the value of the output capacitor 14 so as to prevent intermittent oscillation from occurring and to stabilize the output even if the oscillation becomes intermittent. Additional problems will be further described in detail. The indirect control of the output voltage Vo on the basis of the base current $i_B$ by controlling the Zener current $i_Z$ according to the equation (6) if the input voltage Vin is raised or the load 15 is lightened to cause the Zener current $i_Z$ to increase was described above. However, since the term $(r_Z + r_{Cf})i_Z$ of equation (7) increases as the Zener current $i_Z$ increases, the Zener voltage $V_Z$ does not satisfy the equation (9) and the Zener diode 11 remains off. Thus, the base current $i_B$ becomes extremely larger than the target value to cause the excessive current to flow, so that the ON period of the transistor 4 becomes extremely longer than the target value, with the result that the output voltage Vo largely increases. Therefore, since $V_f$ increases, $V_{Cf}$ also increases, the thereby decreasing resultant voltage so that the state during which the base current $i_B$ does not flow is continued until the $V_Z$ of the equation (7) satisfies the equation (9). As a result, the transistor 4 is caused to intermittently oscillate, and the stability of the output voltage Vo is largely lost due to the intermittent oscillation.

If the environmental temperature varies, the values of $r_{Cf}$, $r_Z$ and $i_B$ alters, and the intermittent oscillation tends to feasibly occur.

Furthermore, when the capacity $C_f$ of the capacitor 10 is large, the physical size of the capacitor 10 increases, thus increasing circuitry space and manufacturing cost.

SUMMARY OF THE INVENTION

This invention has an objective of eliminating the above-described drawbacks of the prior-art R.C.C. and has for its main object to provide an R.C.C. capable of handling widely varying ranges to load, input voltage and temperature which often cause the oscillation of the transistor 4 to become intermittent and the output voltage to become unstable without the use of a dummy load or increasing the value of the output capacitor 14.

In the R.C.C. of this invention, a first current output from a feedback winding of a transformer is branched to a second current flowing to a branch circuit for varying an impedance in response directly or indirectly to the voltage of a primary winding, the feedback winding or a secondary winding when a transistor is off, the base of the transistor is controlled by the remaining current to control an output voltage, and an impedance element is inserted through the base and emitter junction of the transistor in parallel with the branch circuit.

The R.C.C. of the invention inserts the impedance element in series with the base and the emitter junction to thereby increase the varying ranges to the load, the input voltage and the temperature for turning on a Zener diode to act to remarkably increase the varying range which does not cause the oscillation to become intermittent.

BRIEF DESCRIPTION OF THE DRAWINGS

In the drawings, the same symbols indicate the same or corresponding parts.

DESCRIPTION OF THE PREFERRED EMBODIMENTS

Now, an embodiment of the present invention will be described with reference to the accompanying drawings.

Figure 4:
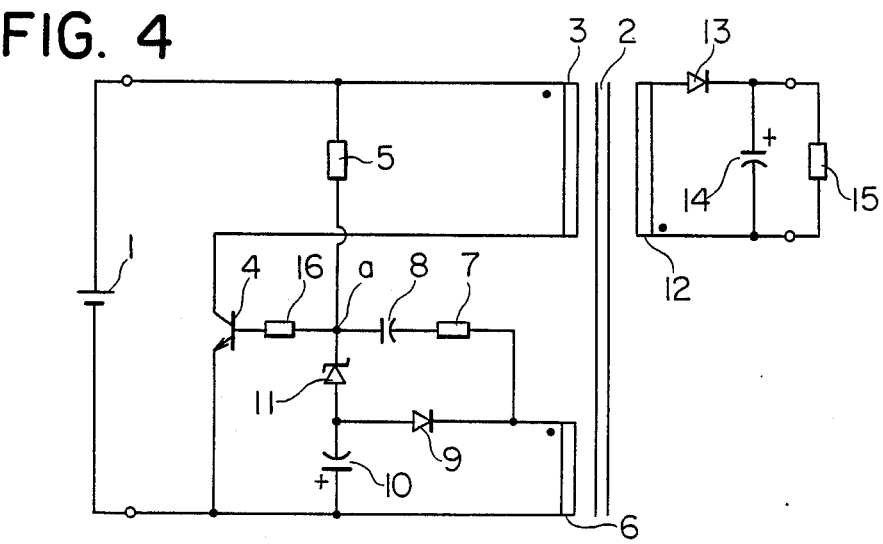
FIG. 4 is a circuit diagram of an embodiment of an R.C.C. according to the present invention.

In FIG. 4, numeral 1 denotes a d.c. power source and numeral 2 a transformer having a primary winding 3, a feedback winding 6, and a secondary winding 2. The starting end of the primary winding 3 is connected to the positive electrode of the d.c. power source 1, and the finishing end of the primary winding 3 is connected to the collector of a transistor 4. The emitter of the transistor 4 is connected to the negative electrode of the d.c. power source 1. Numeral 5 denotes a starting resistor connected at one end thereof to the positive electrode of the d.c. power source 1, and connected at the other end thereof through a resistor 16 to the base of the transistor 4. The starting end of the feedback winding 6 is connected through a series circuit including a resistor 7, a capacitor 8 and the resistor 16 to the base of the transistor 4, and the finishing end of the feedback winding 6 is connected to the emitter of the transistor 4. Numeral 9 denotes a diode having the cathode side connected to the starting end of the feedback winding 6, and the anode side connected to the negative electrode of a capacitor 10. The positive electrode of the capacitor 10 is connected to the finishing end of the feedback winding 6. Numeral 11 denotes a Zener diode having the cathode side connected to the connecting point a of the resistor 5, the resistor 16 and the capacitor 8, and the anode side connected to the negative electrode of the capacitor 10. The starting end of the secondary winding 12 is connected to the negative electrode of a capacitor 14, and the finishing end of the secondary widing 12 is connected to the anode side of a diode 13. The cathode side of the diode 13 is connected to the positive electrode of the capacitor 14. Numeral 15 denotes a load connected to both ends of the capacitor 14.

Figure 1:
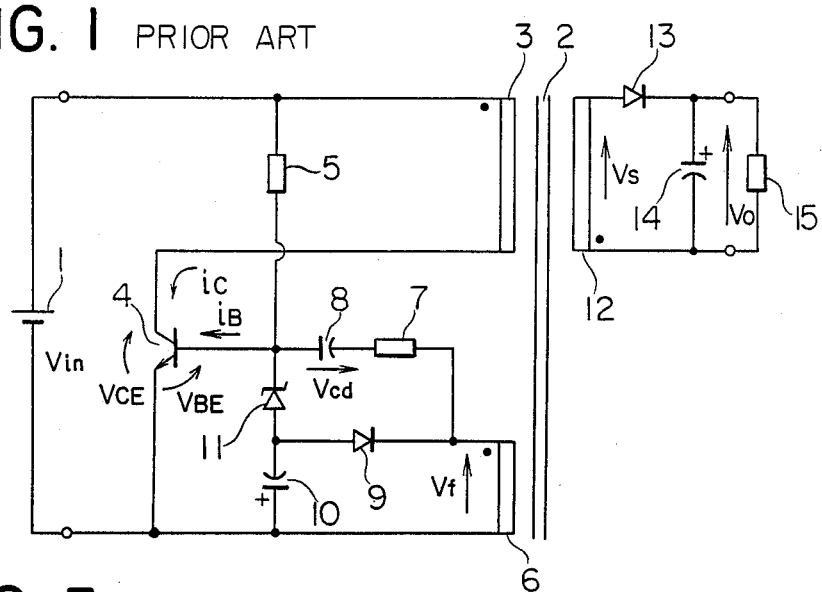
FIG. 1 is a circuit diagram showing a prior-art ringing type DC/DC converter.
Figure 3:
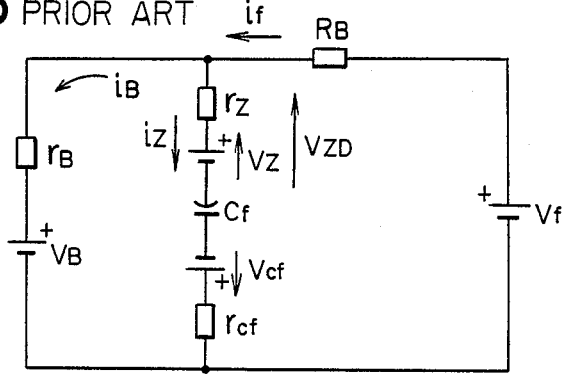
FIG. 3 is an equivalent circuit diagram of a voltage control section of the circuit in FIG. 1.

Since the arrangement of the R.C.C. as described above is similar to that of the prior-art example shown in FIG. 1 with the exception of the addition of the resistor 16, only the operation pertaining to the voltage control is described in detail.

Figure 5:
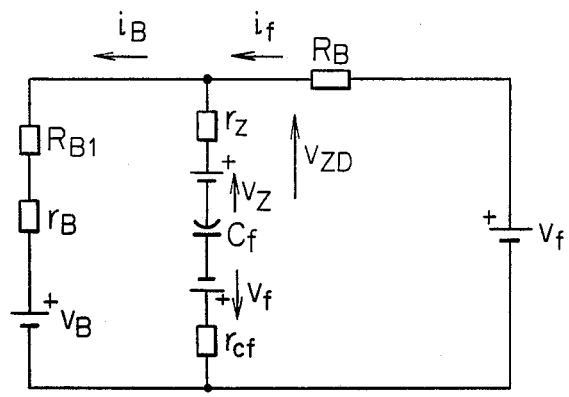
FIG. 5 is an equivalent circuit diagram of a voltage control section of the circuit in FIG. 4.

When an equivalent circuit of the voltage controller of FIG. 4 is drawn, FIG. 5 is attained. When an equation corresponding to the equation (4) is calculated in the same manner as the prior-art example from FIG. 5, the following equation (10) is attained.

$$(r_B + R_{B1})i_B + V_B = r_z i_z + V_z + \frac{1}{C_f} \int i_z dt - V_{Cf} + r_{Cf} i_z \quad (10)$$

With the same assumption as that of the prior-art example, the equation (10) can be represented by the following equation (11).

$$V_z = R_{B1} i_B + V_B + V_{Cf} - (r_z + r_{Cf}) i_z \quad (11)$$

Therefore, since the term $R_{B1} i_B$ increases by inserting the resistor 16 to the base and the emitter junction of the transistor 4 even if the input voltage Vin rises or the load 15 increases to cause the Zener current $i_z$ to increase, the off range of the Zener diode 11 is widened, and even if the Zener current $i_z$ increases in the amount of $R_{B1} i_B$ as compared with the equation (7) of the prior-art example, the equation (9) is satisfied. Therefore, the ranges to the load and the input voltage that do not cause the oscillation to become intermittent are remarkably improved. Since the term $R_{B1} i_B$ is provided in the equation, the range to the environmental temperature is also remarkably improved.

Figure 6:
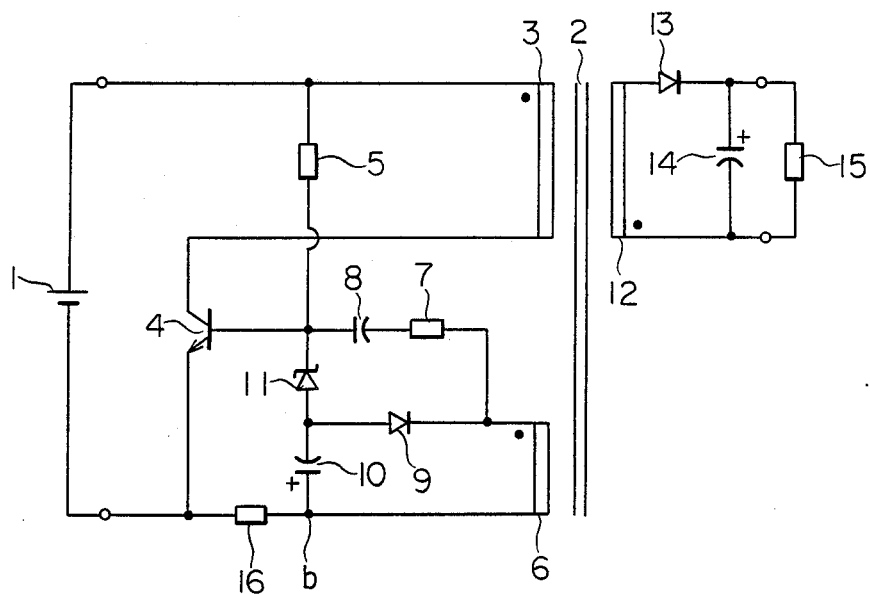
FIGS. 6 and 7 are circuit diagrams of another embodiment of the R.C.C. according to the invention.

In the embodiment described above, the resistor 16 has been inserted between the base of the transistor 4 and the connecting point a. However, the same advantages can be also provided even if the resistor 16 is inserted between the emitter side of the transistor 4 and a connecting point b as shown, for example, in FIG. 6.

In the embodiment described above, the resistor 16 has been used as a circuit element for generating a voltage when a current flows therethrough. However, the same advantages can be also provided even if the junction of a diode, a Zener diode or a transistor, or the combination thereof is, for example, inserted so that the direction for generating a voltage is forward to the direction of the junction between the base and the emitter of the transistor 4, and a reverse current bypassing diode is connected directly or indirectly.

Figure 7:
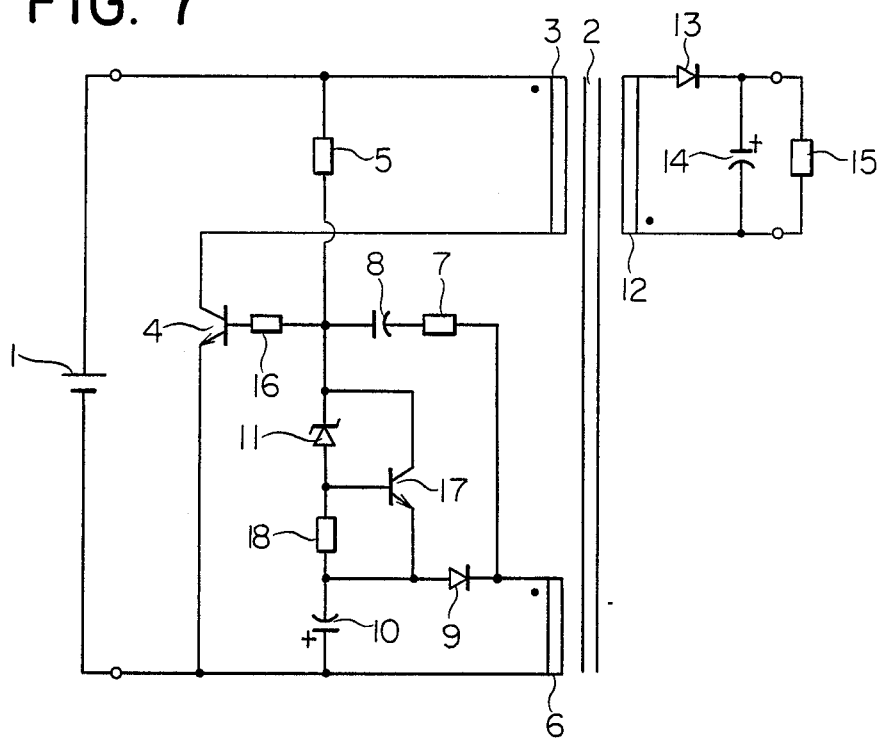

In the embodiment described above, the base current of the transistor 4 for controlling the output voltage has been controlled by the Zener diode 11. However, any circuit of circuit elements or its combination may be used if the circuit can vary the impedance in response directly or indirectly to the voltage of the primary winding 3, the feedback winding 6 and the secondary winding 12 when the transistor is off, and its example will be, for example, shown in FIG. 7.

In the embodiment described above, the Zener diode 11 and the capacitor 11 are connected in series. However, the same advantages can be also provided if the present invention is applied to a circuit if the circuit is provided to shorten the oscillation stopping period of the intermittent oscillation by connecting the capacitor 10 and a resistor in parallel.

According to the present invention as described above, the impedance element is inserted in series with the base and the emitter junction of the transistor for controlling the output voltage of the R.C.C. Therefore, the allowable varying ranges to the load, the input voltage and the temperature which do not cause the oscillation to become intermittent can be largely widened, thereby improving the control characteristic, decreasing the capacity of the capacitor which was increased heretofore to eliminate an intermittent oscillation and improving the space and the cost. Since the dummy load heretofore mounted to eliminate the intermittent oscillation can be obviated, the space, the cost and the heat generation can be improved. Further, the output capacitor can be set to the optimum capacity to similarly improve the space, the cost and the heat.

Figure 8:
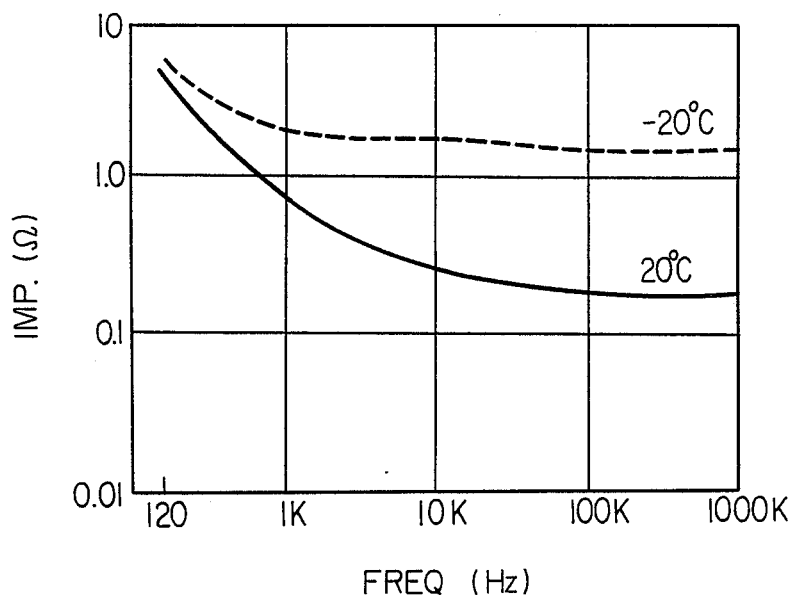
FIGS. 8 and 9 are characteristic diagrams showing the temperature characteristics of capacitors.

The temperature characteristic of the capacitor 10 will be described. FIG. 8 shows frequency-impedance characteristic of the capacitor 10 of the R.C.C. In FIG. 8, a solid line illustrates the impedance at the environmental temperature (ambient temperature) of 20° C., and a broken line illustrates the impedance at the environmental temperature (low temperature) of −20° C. Since the R.C.C. is usually used in a frequency range of 10 to 100 kHz, it is understood from FIG. 8 that the impedance variations at the ambient temperature becomes approx. 10 times as high as those at the low temperature. Since the $r_{Cf}$ increases at the low temperature in term of the equation (7), the Zener voltage $V_Z$ does not satisfy the equation (9) according to the load and/or input voltage conditions to become the state that the diode 11 is not turned on. Thus, since the base current $i_B$ becomes extremely larger than the target value to cause an excessive current to flow to the transistor 4, the ON period of the transistor 4 becomes extremely longer than the target value to cause the output voltage Vo to largely increase. Therefore, since the feedback voltage $V_f$ increases, the charging voltage $V_{Cf}$ also increases, the charging voltage $V_{Cf}$ resultantly decreases, the state that the base current $i_B$ does not flow continues until the Zener voltage $V_Z$ of the equation (7) again satisfies the equation (9), and the oscillation of the transistor 4 becomes intermittent to cause the transistor 4 to become intermittent. The stability of the output voltage Vo is largely lost due to the intermittent oscillation.

Figure 9:
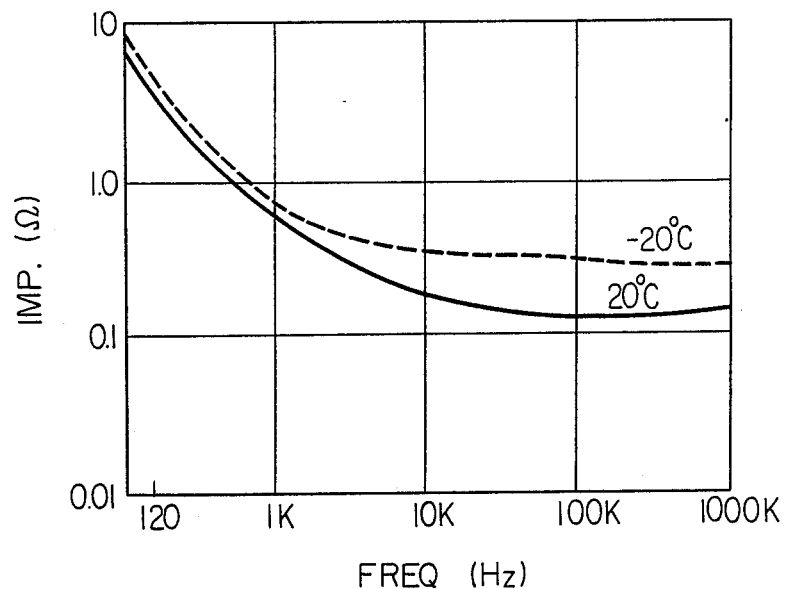

Therefore, the capacitor 10 has characteristics that the value of the capacity thereof in the switching frequency of the transistor 4 becomes several times smaller than the value at the ambient temperature, i.e., the characteristics as shown in FIG. 9. Thus, the variations in the impedances at both the ambient and low temperatures are on the order of several times more or less. Therefore, since the variation in the impedance $r_{Cf}$ is small, the influence of the term $r_{Cf}$ in the equation (7) decreases to satisfy the equation (9) at the low temperature, and the temperature of the intermittent oscillation becomes remarkably lower than that of the prior-art example, thereby improving the usable temperature range.

Then, the Zener diode 11 of the R.C.C. will be described. The fact that, if the input voltage Vin is now raised or the load 15 is lightened to cause the Zener voltage $v_Z$ to increase, the Zener current $i_Z$ is controlled, the base current $i_B$ is controlled and the output voltage Vo is indirectly controlled according to the equation (6) is as described above. Since the Zener diode 11 is heretofore decided according to the allowable loss, the Zener diode having the allowable loss as high as the loss usually generated by observing the margin was used. Thus, since the operating resistor $R_Z$ in the equation (7) affects larger influence than the other terms and the term $-(r_Z+r_{Cf})i_Z$ increases as the Zener current $i_Z$ increases, the Zener voltage $V_Z$ does not satisfy the equation (9) so that the Zener diode 11 becomes the state that does not become on. Therefore, since the base current $i_B$ becomes extremely larger than the target value to cause the large current to flow, the ON period of the transistor becomes extremely longer than the target value, thereby largely increasing the output voltage Vo. Accordingly, since the feedback voltage $V_f$ increases, the charging voltage $V_{Cf}$ also increases, thereby decreasing the resultant voltage so that the state during which the base current $i_B$ does not flow is continued until the Zener voltage $V_Z$ of the equation (7) again satisfies the equation (9). As a result, the transistor 4 is caused to oscillate intermittently and the stability of the output voltage Vo is largely lost due to the intermittent oscillation.

If the environmental temperature varies, the impedance component $r_{Cf}$ of the capacitor 10, the operating resistance $r_Z$ of the Zener diode 11 and the operating resistance $r_B$ of the transistor vary, and it becomes the state that the intermittent oscillation feasibly occurs.

The capacitor $C_f$ of the capacitor 10 which is increased to ignore the influence in the equation (4) must be increased in the actual circuit so that the space and the cost become disadvantageous. Therefore, the Zener diode 11 has the allowable loss several times as high as the loss generated therein. Thus, the operating resistance of the Zener diode is lower than the prior-art example, and the influence of the voltage drop due to the Zener current flowing to the branch circuit when the base current flows can be suppressed to low, thereby largely widening the varying ranges to the load, the input voltage and the temperature which causes the oscillation to become intermittent to improve the characteristics.

Figure 2:
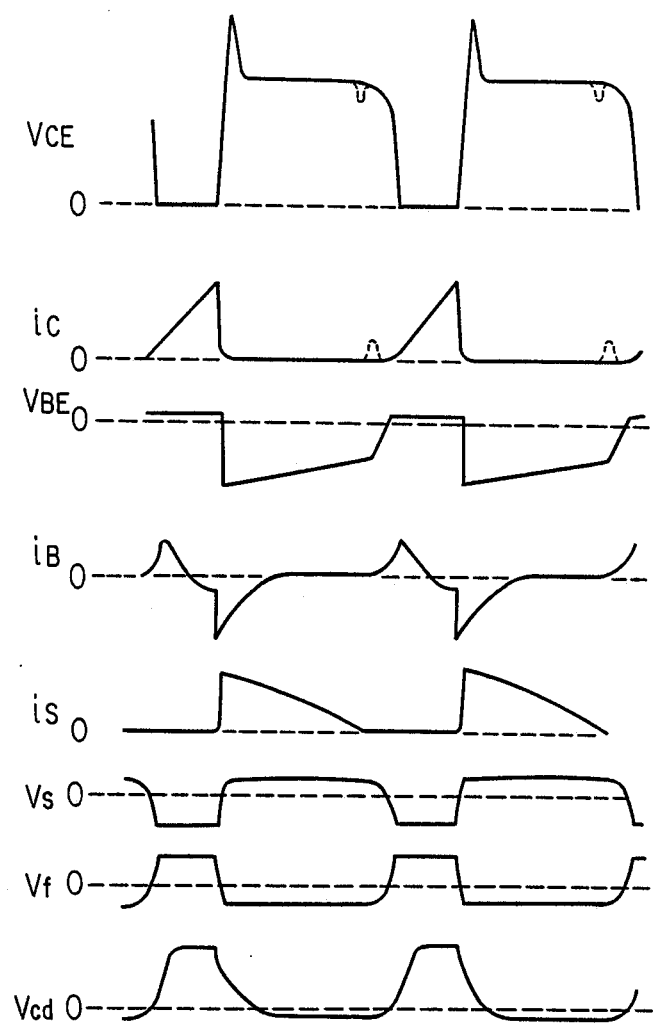
FIG. 2 is a waveform diagram showing the waveforms of respective points when the circuit in FIG. 1 operates.
Figure 10:
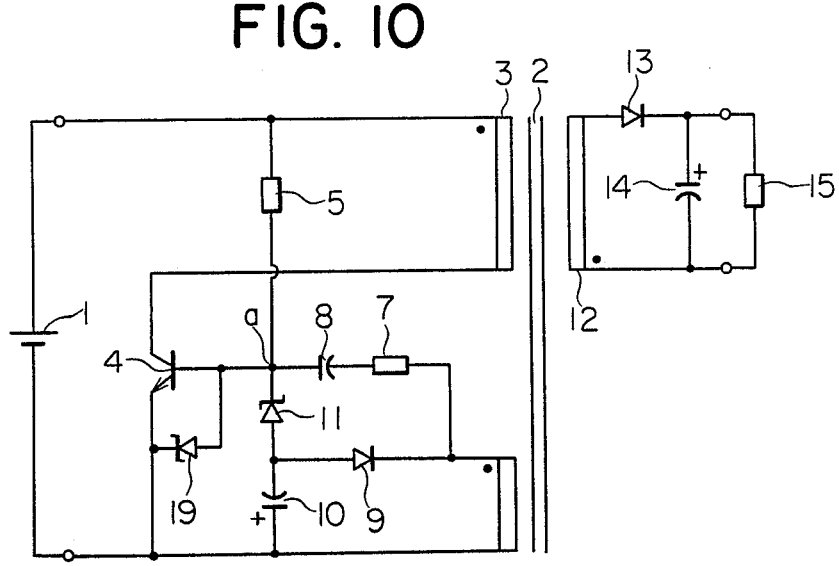
FIGS. 10 and 11 are circuit diagrams showing still another embodiment of the R.C.C. using constant-voltage elements.

Then, the voltage $V_{CE}$ between the collector and the emitter of the transistor 4 will be described. A reverse voltage is generated, as shown in FIG. 1, between the base and the emitter of the transistor 4 when the transistor 4 is turned off, but the voltage of the feedback winding 6 moves in the direction for eliminating the voltage when the variation in the magnetic flux in the core of the transformer 2 becomes constant as described with respect to FIG. 1. Thus, the voltage of the feedback winding 6 decreases, and the voltage $V_{BE}$ between the base and the emitter of the transistor 4 becomes positive. Therefore, the transistor 4 tends to turn on at this time, but since the base current $i_B$ is less, the transistor 4 cannot be sufficiently saturated. Thus, the $V_{CE}$ waveform is deformed as shown by a broken line in FIG. 2. Since the collector current $i_C$ also flows to the transistor 4, a loss is generated to cause the transistor 4 to be largely heated. Therefore, it becomes necessary to increase a cooling fin or to select the transistor 4 of large margin, thereby increasing the cost. Thus, as shown in FIG. 10, a constant-voltage element of a constant-voltage diode 19 is connected to the transistor 4. In other words, the constant-voltage diode 19 is connected at the cathode side thereof to the emitter of the transistor 4, and connected at the anode side thereof to the base of the transistor 4.

In the R.C.C. constructed as described above, the operation to the oscillation is the same as that of the prior-art example shown in FIG. 1, and the description thereof will be accordingly omitted. The elimination of the distortion of the waveform of the collector voltage $V_{CE}$ will be described in detail. A voltage of deeply negative direction is applied between the base and the emitter of the transistor 4 by the operation of the constant-voltage diode 19 in term of the off period of the transistor 4. Therefore, when the variation in the magnetic flux in the core of the transformer 2 becomes constant, the feedback winding voltage starts decreasing, but since the base and the emitter voltage does not become positive until the base current $i_B$ becomes the sufficient value for saturating the transistor 4, the transistor 4 is not turned on, thereby eliminating the distortion of the $V_{CE}$ waveform like the prior-art example to obviate the loss due to the distortion.

Figure 11:
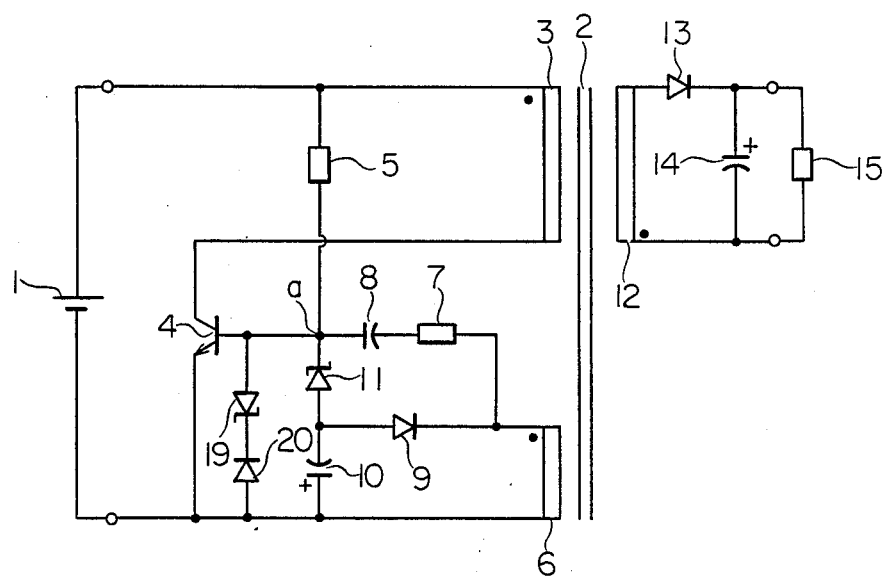

In the embodiment described with respect to FIG. 10, the constant-voltage diode 19 has been connected between the base and the emitter of the transistor 4 to deepen the voltage between the base and the emitter to the negative side in the state that the transistor 4 was off. However, the constant-voltage diode 19 may be any if it is constant-voltage element, and the constant-voltage diode 19 may be connected in series with a diode 20 as shown in FIG. 11.

What is claimed is:

1. A ringing choke-type DC/DC converter comprising:
   a transformer having a primary winding, a feedback winding, and a secondary winding;
   a transistor having a base and an emitter and connected between said primary winding and said feedback winding;
   an input DC power source connected to said primary winding through said transistor;
   a DC power output connected to said secondary winding;
   a base circuit having a first capacitor and connected between the base of said transistor and said feedback winding;
   a branch circuit branching from said base circuit and having a Zener diode connected in series with a second capacitor, and
   stabilizing means including an impedance element connected in series between said transistor and said branch circuit for preventing said transistor intermittently operating, thereby stabilizing said DC power output.

2. A ringing choke-type DC/DC converter as set forth in claim 1 wherein said second capacitor of said branch circuit has a frequency-response impedance value at a low temperature several times higher than that at an ambient temperature.

3. A ringing choke-type DC/DC converter as set forth in claim 1 wherein the Zener diode of said branch circuit provides a voltage several times higher than a voltage variation of said DC power output.

4. A ringing choke-type DC/DC converter comprising:
   a transformer having a primary winding, a feedback winding, and a secondary winding;
   a transistor having a base and an emitter and connected between said primary winding and said feedback winding;
   an input DC power source connected to said primary winding through said transistor;
   a DC power output connected to said secondary winding;
   a base circuit having a first capacitor and connected between the base of said transistor and said feedback winding;
   a branch circuit branching from said base circuit and having a Zener diode connected in series wih a second capacitor, and
   stabilizing means including a constant voltage element connected across the base and emitter of said transistor for preventing said transistor from intermittently operating, thereby stabilizing said DC power output.

5. A ringing choke-type DC/DC converter comprising:
   a transformer having a primary winding, a feedback winding, and a secondary winding;
   a transistor having a base and an emitter and connected between said primary winding and said feedback winding;
   an input DC power source connected to said primary winding through said transistor;
   a DC power output connected to said secondary winding;
   a base circuit having a first capacitor and connected between the base of said transistor and said feedback winding;
   a branch circuit branching from said base circuit and having a Zener diode connected in series with a second capacitor, and
   stabilizing means including a constant voltage element in parallel with the branch circuit for preventing said transistor from intermittently operating, thereby stabilizing said DC power output.

* * * * *